United States Patent [19]

Lynch

[11] Patent Number: 4,538,937
[45] Date of Patent: Sep. 3, 1985

[54] MARINE CONTINUOUS PIPE LAYING SYSTEM

[75] Inventor: Robert P. Lynch, Tulsa, Okla.

[73] Assignee: Lyntech Corporation, Tulsa, Okla.

[21] Appl. No.: 502,332

[22] Filed: Jun. 8, 1983

Related U.S. Application Data

[62] Division of Ser. No. 226,389, Jan. 19, 1981.

[51] Int. Cl.³ .................... B63B 35/04; F16L 1/00
[52] U.S. Cl. .................................. 405/168; 242/156; 405/165; 405/164
[58] Field of Search ............... 405/168, 169, 170, 171, 405/166, 167; 226/108, 172, 177, 195, 25, 34, 42; 242/156, 84.52 A; 254/134.35 C

[56] References Cited

U.S. PATENT DOCUMENTS

| | | | |
|---|---|---|---|
| 1,418,706 | 6/1922 | Hampton | 242/156 X |
| 2,067,717 | 1/1937 | Lawton et al. | |
| 2,142,136 | 1/1939 | Lawton | |
| 2,488,492 | 11/1949 | Dumbleton | 242/156 X |
| 2,562,990 | 8/1951 | Peebles | 242/156 X |
| 2,756,873 | 7/1956 | Hartley et al. | 254/134.35 C |
| 3,217,499 | 11/1965 | Ishiki | |
| 3,333,432 | 8/1967 | Hale et al. | |
| 3,347,054 | 10/1967 | Sherrod | |
| 3,401,473 | 9/1968 | Schrom | 37/54 |
| 3,429,132 | 2/1969 | Martin | |
| 3,462,963 | 8/1969 | Moore | |
| 3,540,226 | 11/1970 | Sherrod | |
| 3,602,452 | 8/1971 | Sauer | 242/156 X |
| 3,670,514 | 6/1972 | Breston et al. | |
| 3,786,642 | 1/1974 | Good et al. | |
| 3,788,085 | 1/1974 | Holberg | |
| 3,824,798 | 7/1974 | Shiroyama et al. | |
| 3,872,680 | 3/1975 | Nicholson et al. | |
| 3,887,163 | 6/1975 | Prange | 242/156 X |
| 3,898,852 | 8/1975 | Ezoe et al. | |
| 3,952,532 | 4/1976 | Spearman | |
| 3,982,402 | 9/1976 | Lang et al. | 405/168 |
| 4,011,727 | 3/1977 | Suzuki et al. | |
| 4,022,028 | 5/1977 | Martin | |
| 4,037,422 | 7/1977 | deBoer et al. | |
| 4,091,629 | 5/1978 | Gunn et al. | |
| 4,112,695 | 9/1978 | Chang et al. | |
| 4,129,992 | 12/1978 | Carlsson et al. | 405/164 |
| 4,141,667 | 2/1979 | Brown | |
| 4,260,287 | 4/1981 | Uyeda et al. | 405/168 |

Primary Examiner—Dennis L. Taylor
Attorney, Agent, or Firm—Head, Johnson & Stevenson

[57] ABSTRACT

A marine continuous pipe laying system comprising a variable departure angle reel operably connected to a retractable trenching plow and backfilling apparatus. The reel comprises a pipe straightening mechanism connected to the rotational axis of the reel by a yoke for automatically maintaining proper bending moment regardless of the departure angle of the pipe. The plow comprises a shaped chisel share which is pivotally retractable within a sled frame for avoiding existing pipelines and varying the depth of cut and is provided with instrumented guide rollers to permit an operator to adjust the tow length of the plow to properly position the plow with respect to the catenary curve of the pipe being laid. The distance between the plow and the backfilling apparatus is adjustable to insure that the pipe is in the bottom of the trench before backfilling occurs.

6 Claims, 11 Drawing Figures

MARINE CONTINUOUS PIPE LAYING SYSTEM

This is a division of application Ser. No. 226,389, filed Jan. 19, 1981.

BACKGROUND OF THE INVENTION

1. Field of the Invention

The present invention relates to a method and means for laying a marine pipeline and more particularly, but not by way of limitation, to a variable departure reel and straightening mechanism for feeding a continuous length of pipe to a trenching plow having a retractable plowshare and backfilling apparatus, the plow being instrumented to insure the proper position of the plow with respect to the natural curve of the pipe entering the trench.

2. History of the Prior Art

Oil and gas marine pipelines are commonly buried in trenches to protect them from storm currents, anchor and a variety of other material hazards.

Such pipelines are commonly constructed of steel pipe by one of two methods. One method is to weld standard mill lengths of pipe continuously together aboard a barge and move the barge out from under the pipeline. The other method is to weld the pipe at a shore facility and then coil it onto a barge mounted reel. This causes the pipe metal to yield in bending as it conforms to the reel surface. Therefore, the pipe must be yielded in the opposite direction or straightened as it is uncoiled from the reel for laying on the ocean floor.

The commonly constructed reel system is mounted aboard a barge with the reel axis either vertical or horizontal. The straightening is accomplished by an arrangement of either two or three rollers which are configured to continuously stress the pipe in bending the opposite direction within the plane of the coil thus effecting a continuous straightening of said pipe. The straightening rollers are typically located distant from the reel so that the pipe will enter said rollers at a reasonably constant angle which is preferred to be normal to the roller axis and in a plane parallel to the axis of the rollers.

The reason for this distance requirement is that the pipe comes off the reel from constantly varying points across the width of the reel and also comes off said reel at varying tangent positions because the pipe is coiled onto the reel in multiple layers. A typical system is set forth in the patent to Nicholson et al, U.S. Pat. No. 3,872,680, issued Mar. 25, 1975 for a "Method and Apparatus For Laying Pipelines".

Because of this arrangement, the pipe attitude in relation to the barge is normally substantially parallel to the deck as it is played over the stern. Because of this pipe attitude, it is necessary that the pipe be carefully maintained in an S-shaped curve as it is deployed to the sea floor. The bend at the stern of the barge is commonly referred to as the overbend and the bend at the sea floor is commonly referred to as the sagbend. Both of these bends must be carefully maintained at a radius large enough to keep the pipe metal within its elastic stress range in order to prevent buckling.

One way to accomplish this is to employ a ramp, commonly referred to as a stinger, as shown in said Nicholson patent (supra), which combines the use of the stinger and the application of tension to the pipeline in order to prevent buckling at the overbend or at the sagbend. The stinger causes many problems in that it is subject to current drag and loads imposed by the barge movement in the seaway. This stinger may be used with or without a diverter apparatus which provides a plurality of rollers in order to orient the pipe as it leaves the barge at a desired departure angle. Further, when the departure angle is completely controlled from the stern of the barge, rough seas will cause the departure angle to attempt to vary thereby creating the danger of buckling during the overbend operation.

The aforementioned patent to Nicholson et al teaches at FIG. 6 the locating of a straightening apparatus and the reel near the stern of the barge which would permit the pipe to enter the water in a substantially tangent orientation with respect to the reel. This would be a desirable operation if it were not for the continuous adjustments that would have to be made to the straightening apparatus, which is mounted on a pedestal just aft of the reel. Hence, the existing use of pipe reels in the laying of marine pipelines is plagued with many disadvantages.

Substantially all of the prior art plows employed in trenching marine pipelines have been adaptations of conventional agricultural plows mounted in a sled-type frame. In as much as agricultural plows are primarily intended to turn soil over, their usage in digging deep trenches is inefficient and requires large pulling forces. The typical agricultural plowshare normally has a V-type configuration for diverting the soil to the sides as it is being pulled across the ocean floor. However, this continuous movement of the soil to the sides causes extensive compressive loads on the trench walls thereby increasing the drag of the plowshare.

Further, marine oil and gas pipelines are not buried at a constant depth. For example, next to a well platform, the trench depth is commonly six feet while a distance of 600 feet or more from the platform the trench depth may be four feet. Substantially all of the plows being used in marine pipeline activities are not adjustable by depth.

Further, in offshore pipeline oil fields, there are many existing pipelines that must be crossed by a new construction pipeline. These pipelines must be located prior to beginning construction because the trenching plow would inflict serious damage on any pipeline it encounters. A major detraction to a plow trenching method is that at every foreign pipeline crossing, the laying process must be interrupted. The pipeline must be capped and laid on the ocean floor, then the lay barge must be positioned over the plow to pick it up and reset it past the foreign pipeline. This operation involves considerable time and difficulty.

The patent to Suzuki et al, U.S. Pat. No. 4,011,727, issued Mar. 15, 1977 for a "Movable Cable Plow For Constructing Underwater Cable", teaches a vertically adjustable plowshare. However, upon vertical adjustment, the plowshare and its associated cable guide means both must be lifted since the cable guide means rides in the trench behind the plowshares.

Further, since the plowshare of the Suzuki et al cable laying device is elevated by rotation about a forward pivot pin, the point, even when lifted out of contact with the ocean floor, is set at an angle which could damage pipelines or cables laying on the surface.

Offshore oil and gas pipelines are commonly left in open trenches which are eventually backfilled by movement of the bottom soil due to ocean currents. However, in areas where there is little or no current, the line often remains uncovered for years.

There is a backfilling apparatus taught in the patent to Sherrod, U.S. Pat. No. 3,347,054, issued Oct. 17, 1967 for an "Underwater Pipe Trenching Device". However, a plate at the rear of the closing blades causes the soil to build up thereby increasing the drag and also scraping the trench surface flat whereupon subsequent settling leaves the pipe inadequately covered.

SUMMARY OF THE INVENTION

The present invention provides a marine continuous pipe laying system particularly designed and constructed to overcome the disadvantages hereinbefore discussed. The present invention comprises a large pipe reel that is mounted in pedestal bearings with its axis horizontal to the deck and in the preferred, but not required, position of perpendicular to the vessel's longitudinal axis.

The reel would normally be placed at the vessel's stern in a position whereby pipe being unwound from the reel core layer could be moved into the water at a departure angle of 90° from the horizontal. Two straightening rollers are mounted on a yoke framework which is, in turn, hinged onto the pipe reel axis. Hydraulic linear actuators are employed to rotate the yoke through an angular range of positions which thereby establishes a range of desired departure angles for the pipe entering the water.

Therefore, the relative position of the rollers in relation to the nominal diameter of a particular layer of pipe on the reel is constant regardless of the yoke position. The net effect, therefore, is to provide a constant straightening bending moment on the pipe throughout the range of departure angles. This also allows the yoke to be operated in a free pivoting mode allowing the departure angle to adjust to the tension in the pipeline to produce a classic catenary curve for the pipe as it is being laid.

Since the sagbend has a working stress range, a range of departure angles and tension levels can be predetermined to operate without danger of buckling the pipe in the sag-bend. This feature allows the vessel to undulate in a seaway at a greatly reduced level of risk in comparison with other methods.

The pipe reel may be driven by hydraulic motors which are employed to coil the pipe onto the reel. When the pipe is uncoiled, these hydraulic motors serve as pumps with their output directed through adjustable release valves, thus controlling the tension in the pipeline. It is realized that in paying the pipe off of the reel, the same effect could be accomplished through a mechanical or electrical drive and braking system relying on the forward movement of the barge to maintain the desired tension in the pipe.

The pair of straightening rollers are mounted on a pivotal frame carried by the yoke which is adjustable to apply the proper bending moments on the pipe with respect to any particular layer of pipe that is being removed from the reel, thus allowing the pipe to be loaded onto the reel in multiple layers and also to adjust for various pipe diameters.

By monitoring the hydraulic system pressure to the hydraulic linear actuators, it is possible to compute the amount of bending moment load applied to the pipeline, thus controlling the straightening process.

Further, the straightening rollers extend the entire width of the reel, thus eliminating the need for controlling the lateral entrance angle. The straightening roller framework also comprises a lateral winding mechanism for insuring proper level winding of the pipe as it is coiled onto the reel. Naturally, the function of the straightening rollers could be accomplished with more than two rollers or a track-type mechanism secured to the yoke for obtaining the same results.

The burying of the pipeline is accomplished by two primary components, a trenching plow and a backfilling sled. The plowshare of the present invention departs from the prior art in that it is a flat plane chisel-type share rather than the conventional V-shaped share, the flat plane of the chisel cutting edge being perpendicular to the direction of travel of the plow. The plowshare is also angled in order to raise the soil in a vertical direction as it is sheared rather than diverting it to the sides as the V-type plowshares do. This allows the plow to shear through soil without imparting any simultaneous compressive loads on the trench walls.

The plowshare has a vertical splitter plate mounted above the soil line so that the strip of soil being raised by the plow is thus split and diverted to each side of the trench. To insure that the rows of discharged soil do not fall back into the trench, diverter boards are incorporated into the sled framework in order to discharge the soil a safe distance away from the trench edge.

The plowshare may be remotely vertically adjusted from aboard the support vessel without any interruption of the trenching process in order to provide a variable depth of cut of the trench as well as raising the plowshare to move over existing pipelines and obstructions.

The plowshare is mounted in the support sled by a lateral hinge pin about which it may pivot forwardly and upwardly, thus varying the depth of the tip of the blade. A hydraulic cylinder is appropriately incorporated to provide the motivation for adjusting the position of the plowshare and thusly the depth of the trench cut. It is important to note that because the diverter boards are mounted on the sled framework, their position remains constant regardless of the plow depth. Further, the bottom or rearward portion of the plowshare is of a skid design so that when the cutting tip is raised out of the trench, it would serve to skid across existing pipelines and cables without causing damage thereto.

The sled embodies an arrangement of vertical guide rollers mounted above the share through which the pipe passes, thus guiding it into the trench. A horizontal lateral roller is located at the bottom of the vertical rollers upon which the pipe normally rides. This roller is instrumented with load indicating devices to allow the operator to be aware of the load that the pipeline is bearing on the bottom roller. The ideal catenary curve for the pipeline may be computed for any particular pipe and, thus an optimum bearing load for the pipe on the bottom roller may be predetermined. By monitoring the actual bearing load, the operator can determine whether the plow is located in the proper position on the catenary curve and make immediate corrections by way of either lengthening or shortening the tow line between the plow and the barge.

The present invention further comprises a backfilling sled which is towed behind the plow at an adjustable distance in order to insure that the pipeline is resting on the bottom of the trench before backfilling occurs. The backfilling sled incorporates two diverter boards which are positioned and angled so as to impinge upon the rows of discharged soil left by the plow and divert said rows of soil back into the center of the ditch. A gap in the diverter boards is provided at the center so that the excess soil will be deposited in a continuous mound over the filled ditch. This mound is helpful in insuring proper coverage of the pipe when settling occurs after the trench has been backfilled.

Therefore, the unreeling of the pipeline, the plowing and backfilling is simultaneously commenced and the speed of the process is determined by the pipe fabrication or reeling technique. Variation of trench depth may be accomplished without interruption to the laying of the pipeline.

DESCRIPTION OF THE DRAWINGS

Other and further advantageous features of the present invention will hereinafter more fully appear in connection with a detailed description of the drawings in which.

DESCRIPTION OF THE PREFERRED EMBODIMENTS

Figure 11:
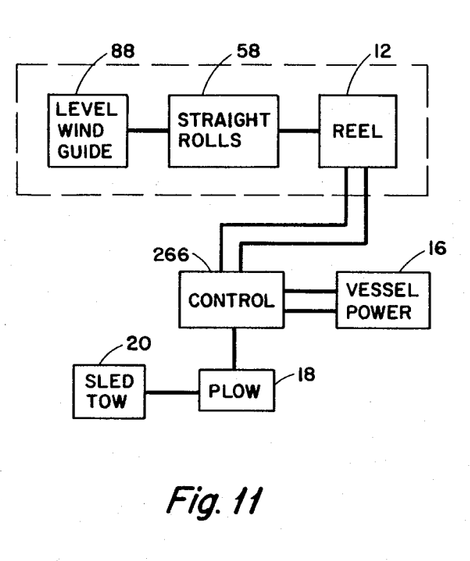
FIG. 11 is a functional block diagram of the control system for the pipe laying system of FIG. 1.

Referring to the drawings in detail, reference character 10 generally indicates a continuous marine pipe laying system comprising a reel generally indicated by reference character 12 which is mounted on a barge or marine vessel 14. The marine vessel 14 may be towed or provided with its own motivating power source which is not shown in FIG. 1 but appears in the schematic diagram of FIG. 11 by reference character 16.

Figure 1:
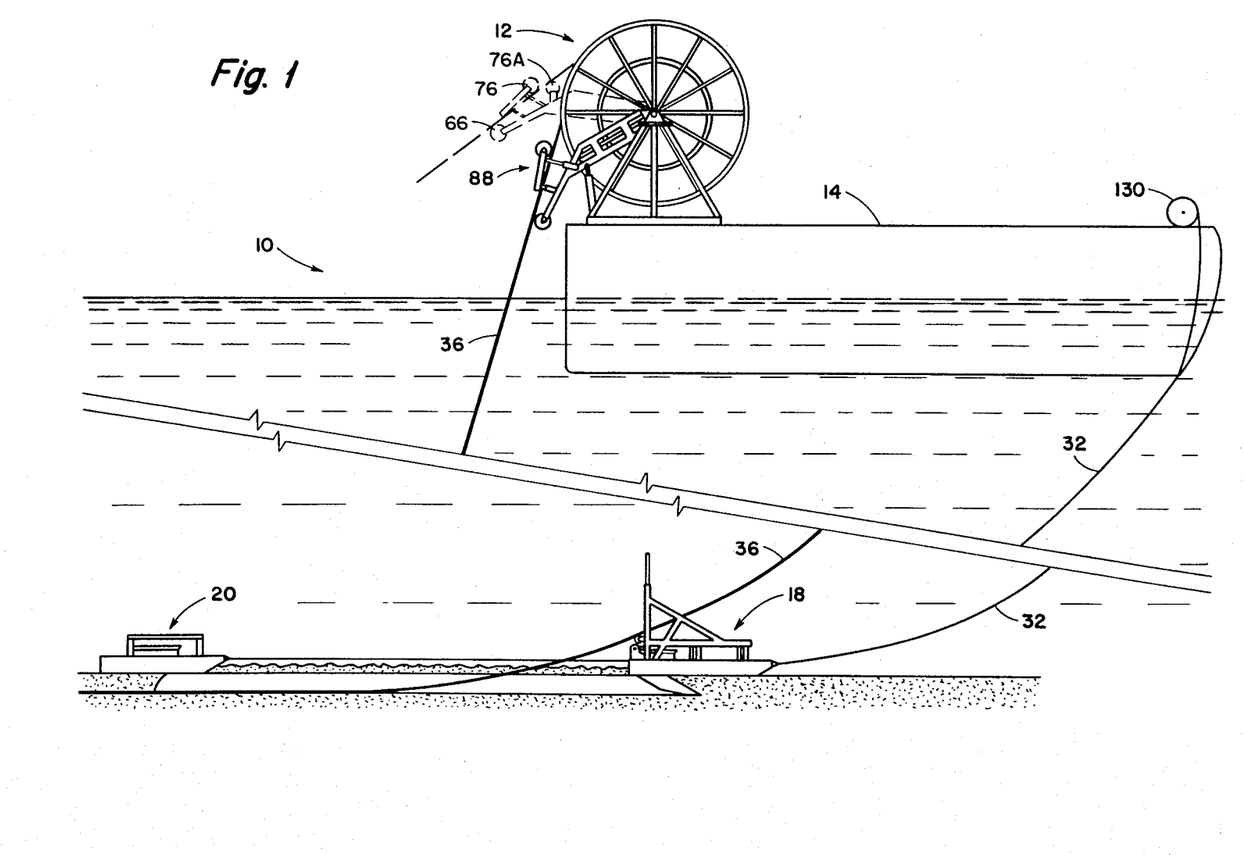
FIG. 1 is a side elevational view of a marine continuous pipe laying system embodying the present invention.

The system further comprises a trenching plow generally indicated by reference character 18 which is operably connected to the vessel 14. A trench backfilling apparatus generally indicated by reference character 20 is, in turn, towed by the plow 18.

Figure 2:
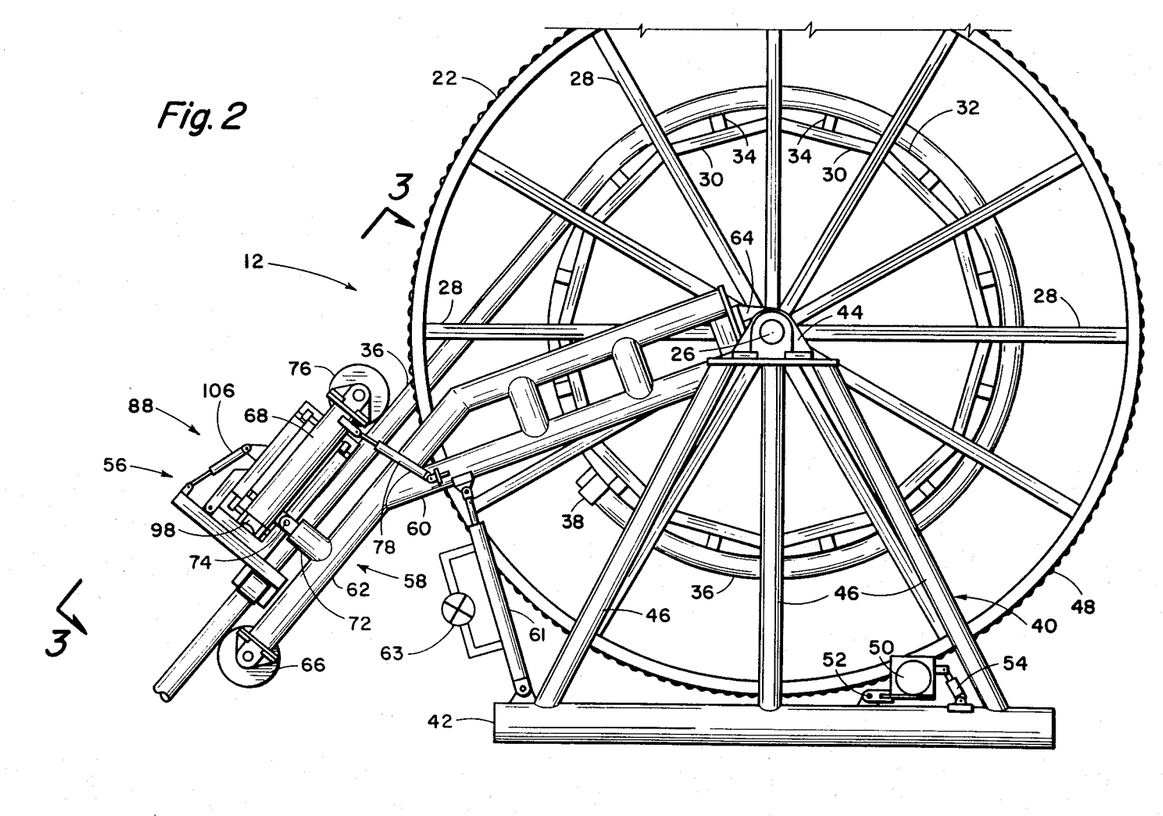
FIG. 2 is a side elevational view of the reel and pipe straightening device of FIG. 1.

The reel mechanism 12 comprises a pair of spaced circular rim members 22 and 24 carried by an axle 26 by way of a plurality of spoke members 28. The mid-portions of the spokes 28 are, in turn, supported by a plurality of web bars 30. A circular base plate or drum 32 is supported by the web members 30 and crossbars (not shown) including stiffening members 34. The circular plate 30 serves as the base to support a length of pipe 36 therearound, the end of which may be held in place on the plate member 32 by a suitable clamping means 38.

The horizontally disposed axle member 26 is rotatably supported by a pedestal framework generally indicated by reference character 40 having base members 42 and pillow blocks 44 secured thereto by way of leg members 46. The circular rim members 22 and 24 are provided with elongated flexible chains 48 and 49 secured around the outer periphery thereof. At least one chain drive unit 50 which may be electrically, hydraulically or otherwise mechanically driven is operably connected to the reel.

The unit or units 50 are pivotally supported by the base member 42 about pivot pin 52 and contact with the chain member is provided by way of a linear hydraulic actuator 54. The drive unit 50 may serve to rotate the reel 12 for loading or off-loading pipe onto the reel or may serve as a braking member when the pipe is being pulled off the reel by tension forces as will be hereinafter set forth.

A pipe straightening apparatus generally indicated by reference character 56 is operably connected to the reel 12 by means of a yoke assembly 58. The yoke assembly 58 comprises a pair of spaced arm structures 60 and 62. The inner ends of the arm members 62 are pivotally secured to the reel axle 26 by means of suitable pillow blocks 64.

Figure 3:
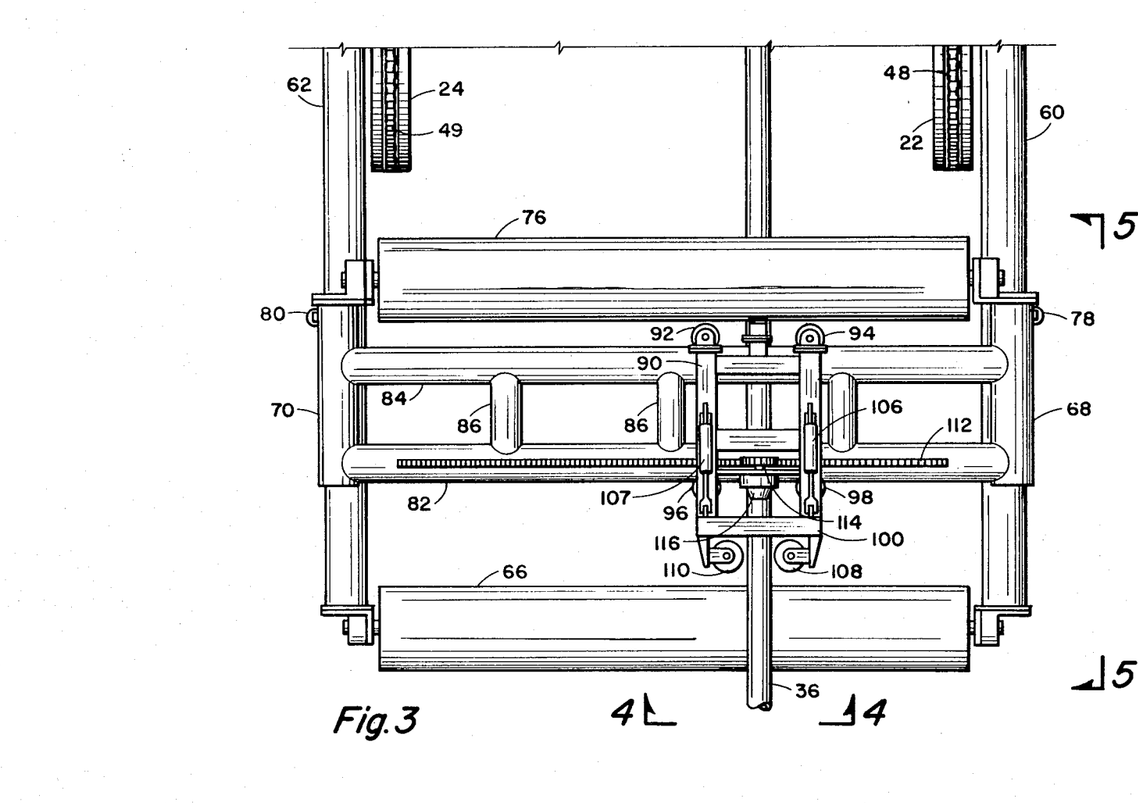
FIG. 3 is a top plan view of the straightening device of FIG. 2.
Figure 4:
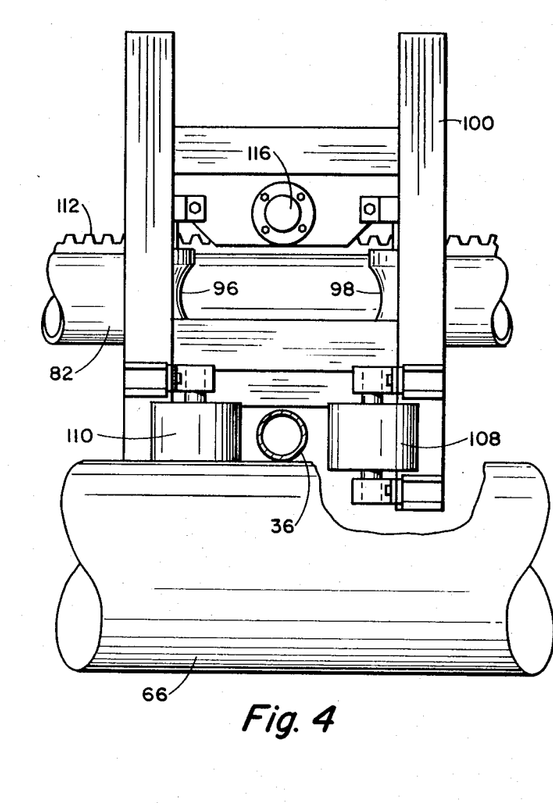
FIG. 4 is an end elevational sectional view of the pipe straightening device of FIG. 3 taken along the broken lines 4—4 of FIG. 3.

The outer ends of the arm members 60 and 62 are connected together by an elongated roller member 66 rotatably secured therebetween. A second pair of arm members 68 and 70 are pivotally secured to the yoke arms 60 and 62 by means of boss members 72 and pivot pins 74. The boss members 72 are spaced from the end of the yoke arms 60 and 62 generally toward the reel axis. The second arm members 68 and 70 extend further toward the reel, the inner ends of which are connected by a second elongated roller 76, rotatably connected therebetween. Pivotal action of the arms 68 and 70 about the axis 74 is accomplished by means of a pair of oppositely disposed linear actuators 78 and 80.

Therefore, as the pipe 36 is unreeled from the reel 12, it is passed under roller 76 and over roller 66, a suitable tensioning force being applied by linear actuators 78 and 80 in order to straighten the pipe 36 after it leaves the reel 12. It is noted that the pivotal axis 74 of the roller 76 is parallel to the rotational axis 26 of the reel.

The number of straightening rollers is not limited to two as shown in the drawings, but may comprise three or more. In the embodiment shown the reel surface is used as one of the two required reaction points, the second reaction point being provided by roller 66. The bending is accomplished by the controlled roller 76. A third roller 76A shown by dashed lines in FIG. 1 may be substituted as a reaction point if desired.

It is further seen that since the rollers 66 and 76 are long enough to extend over the full width of the reel 12, pipe may enter the rollers regardless of its lateral position along the reel 12.

Figure 5:
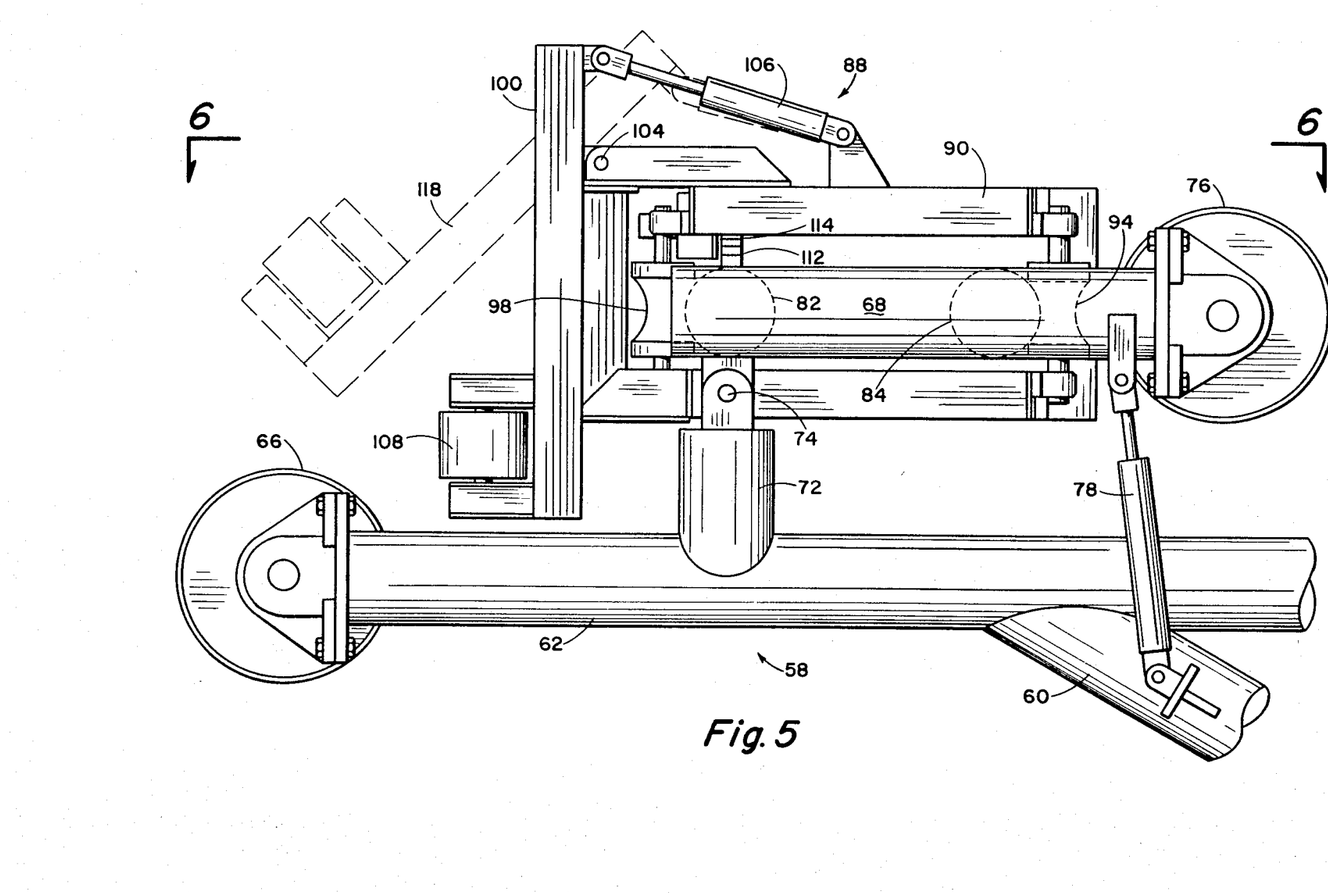
FIG. 5 is a side elevational view of the pipe straightening device of FIG. 3 taken along the broken lines 5—5 of FIG. 3.
Figure 6:
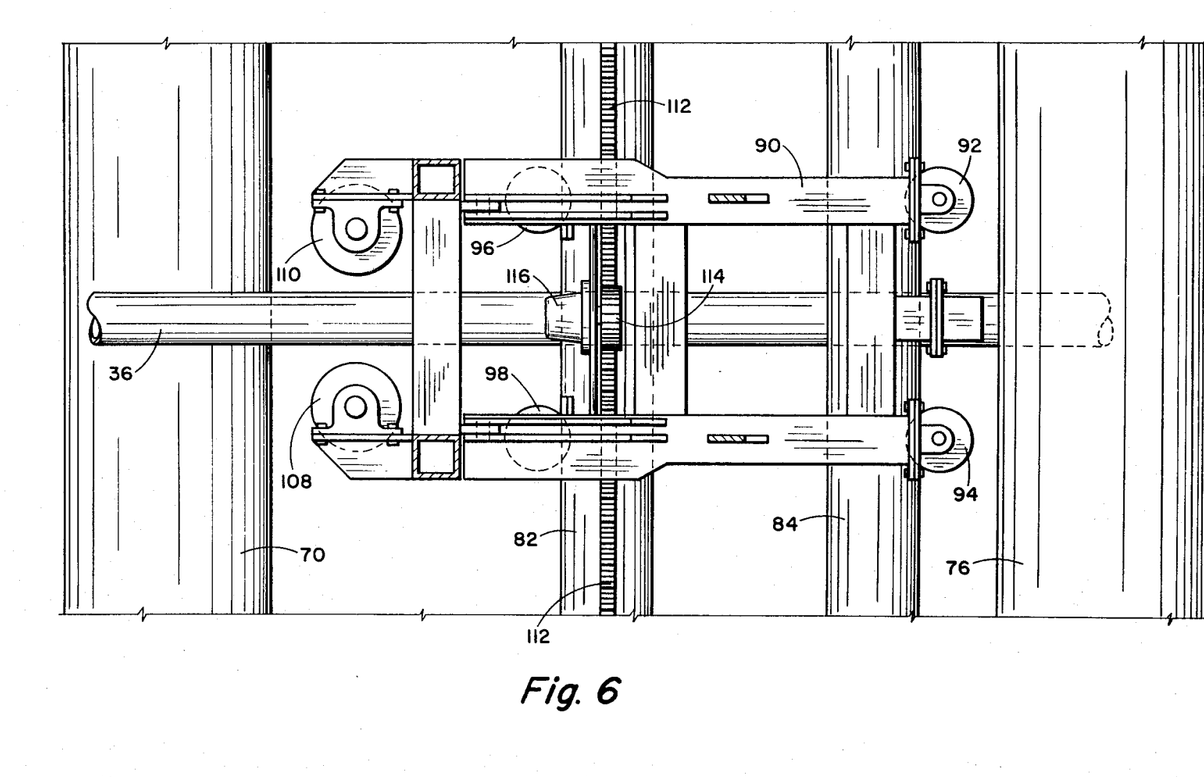
FIG. 6 is a top plan sectional view of a level wind mechanism of the straightening device of FIG. 5 taken along the broken lines 6—6 of FIG. 5.

The pivotal arms 68 and 70 for the roller 76 are further connected together by a pair of parallel transverse pipe members 82 and 84 which are strengthened by structural web members 86 therebetween. The crosspipe members 82 and 84 serve to carry a movable level winding mechanism generally indicated by reference character 88 thereon. The level winding apparatus 88 comprises a box frame 90 which surrounds the crosspipes 82 and 84. The forward end of the frame 90 is provided with a pair of spaced spool-type rollers 92 and 94 which are in rolling engagement with the crosspipe 84. The opposite end of the frame 90 is provided with a second pair of spool-type rollers 96 and 98 which are in rolling engagement with the crosspipe 82 whereby the said frame 90 may be moved transversely back and forth along the crosspipes 82 and 84.

The level winding apparatus 88 further comprises a second frame member 100 which is pivotally secured to the top outer ends of the frame 90 by way of a pair of pivot pins 104. The upper end of the frame 100 is connected to the top of the frame 90 by a linear actuator 106. The lower end of the frame 100 is provided with a pair of spaced guide rollers 108 and 110.

An elongated rack of gear teeth 112 is provided along the top surface of the cross member 82. A pinion gear 114 is then journalled on the frame 90 and is positioned in meshing engagement with the rack 112. A drive motor or actuator 116 is operably connected to the pinion gear 114 for controllably moving the pinion gear with respect to the rack 112.

In operation when loading the pipe 36 onto the drum 32, the level winding apparatus 88 is placed into position over the pipe and the frame member 100 is lowered in order for the pipe to rest between the guide rollers 108 and 110.

The actuator 116 may then be operated in order to guide the pipe 36 onto the drum so that each wrap around the drum is adjacent the preceding wrap. The level winding mechanism 88 may then be moved back and forth as each layer of pipe is rolled onto the drum.

Since it is a common practice with the present invention to allow the tension in the pipeline to unreel the pipe 36, the level wind mechanism 88 may be taken out of play by pivoting the frame member 100 upwardly by means of the hydraulic linear actuator 106 as shown by the dashed lines 118 of FIG. 5. As hereinbefore stated it is not necessary to control the lateral unwinding of the pipe since the straightening rollers 66 and 76 are at least as long as the width of the reel thereby allowing the pipe to come off at practically any position therealong in order for straightening to occur.

At least one linear actuator 61 is operably connected between the yoke 58 and the pedestal 42. The actuator 61 is double ended and may be driven by hydraulic fluid at a junction 63 or the junction may be provided with a restriction orifice in order to act as a shock absorber in a non-driven mode. In the driven mode a desired departure angle may be effected.

Figure 7:
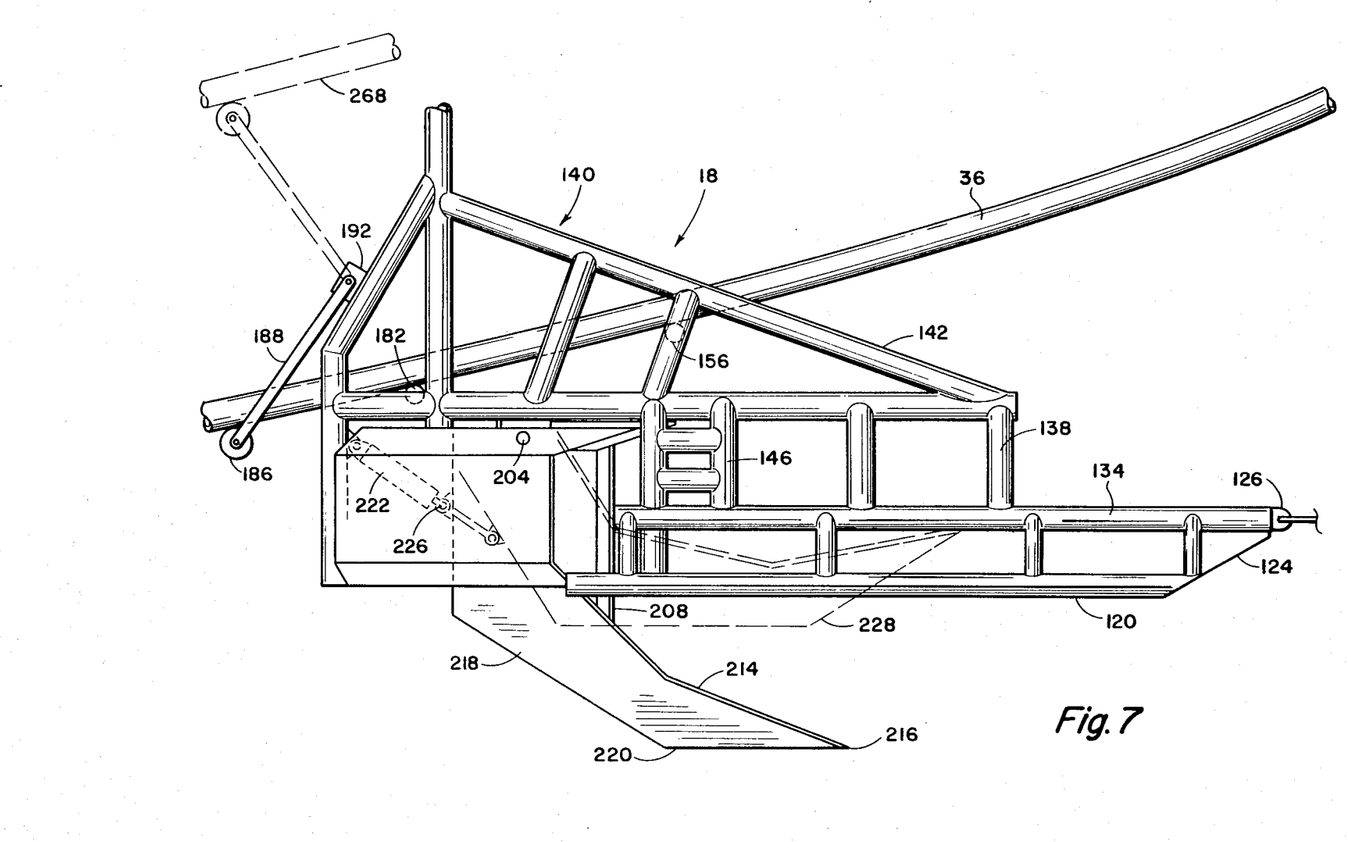
FIG. 7 is a side elevational view of the trenching plow of FIG. 1.
Figure 8:
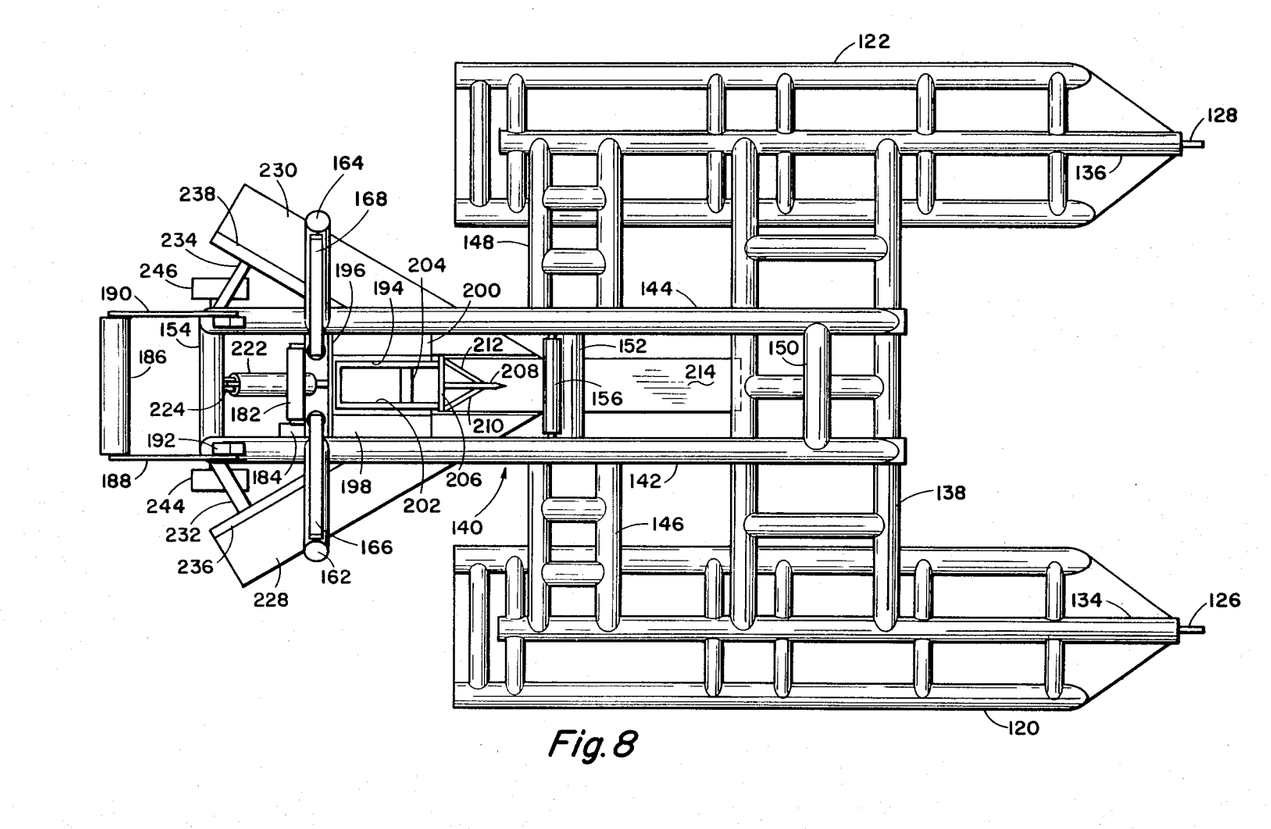
FIG. 8 is a top plan view of the trenching plow of FIG. 7.
Figure 9:
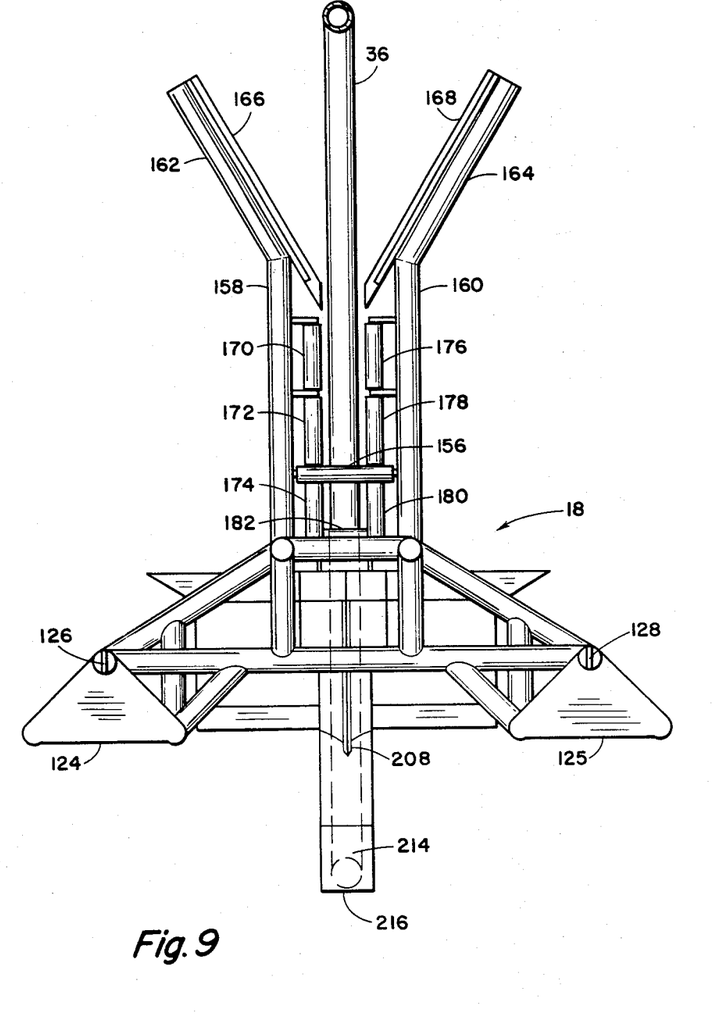
FIG. 9 is an end elevational view of the trenching plow of FIG. 8.

Referring now to FIGS. 7, 8 and 9 of the drawings, the plow 18 generally comprises a pair of spaced, parallel runners 120 and 122. The runners are provided with a bevelling 124 and 125 at the front end thereof to permit smooth transition across obstacles on the ocean floor. The forward end of each of the runners is provided with a towing eyelet 126 and 128, respectively, for operably connecting the plow to an adjustable reel 130 carried by the barge or vessel 114 as shown in FIG. 1 by means of a suitable tow line or lines 132.

The runners 120 and 122 are comprised of welded pipe members, each having a centrally disposed upper rib member 134 and 136, respectively. The rib members 134 and 136 are connected at about their center portion by a first cross frame 138 therebetween.

The plow further comprises a centrally disposed longitudinal center frame 140 which is secured at the front end thereof to the cross frame 138 and extends rearwardly of the runners 120 and 122. The center frame 140 comprises a pair of parallel longitudinal triangular shaped frame members 142 and 144 which extend upwardly and rearwardly from their final attachment with the cross frame 138.

The frame member 142 is connected to the runner 120 by a cross frame 146 while the frame member 144 is connected to the runner 122 by a cross frame 148.

The frame members 142 and 144 are held in spaced relationship by a front cross member 150, a mid-cross member 152 and a rear cross member 154. A first longitudinally disposed guide roller 156 is journalled between the frame members 142 and 144 and is located above the cross member 152.

A pair of spaced vertical standards 158 and 160 are secured to the triangular frame members 142 and 146, respectively. An outwardly and upwardly extending guide bar 162 is connected to the upper end of the standard 158 while an upwardly and outwardly extending guide bar 164 is connected to the upper end of the standard 160.

A pair of elongated guide rails 166 and 168 are secured to the upper inside surfaces of the guide bars 162 and 164, respectively, thereby forming a V-shaped funneling guide member for receiving the pipe 36 therethrough, the lower inside ends of the guide rails 166 and 168 being provided with an opening to allow the pipe to pass therethrough. A plurality of inwardly facing vertically disposed guide rollers 170, 172 and 174 are secured to the inside surface of the standard 158 and are in substantial alignment with the aperture formed between the guide rails 166 and 168. Likewise, a plurality of vertically oriented guide rollers 176, 178 and 180 are secured to the inside surface of the standard 160, the plurality of said guide rollers forming a channel for receiving the pipe 136 therein. The base of the channel is provided with a horizontal transverse guide roller 182 which is spaced rearwardly and at a lower elevation than the guide roller 156 hereinbefore described. The guide roller 182 may be instrumented by means of a load sensor 184 for sensing the load applied by the pipe 36 thereon for a purpose that will hereinafter be set forth.

A rearwardly extending sensor roller 186 is pivotally secured to the rear end of the frame 140 by a pair of pivot arms 188 and 190 which are operably connected to a position sensing indicator 192 again for a purpose that will be hereinafter set forth.

A rectangular shaped forwardly facing channel member 194 is secured to the center frame 140 adjacent the vertical standards 158 and 160 by means of a transverse plate member 196 and web plates 198 and 200. A plowshare frame member 202 is pivotally secured to the housing 194 by a pivot pin 204. The forward end of the frame 202, is provided with a transverse plate 206 having a forwardly extending vertically oriented divider blade 208 secured to the front surface thereof. The divider blade 208 is held in place by a pair of vertically disposed angular diverter plates 210 and 212.

A chisel shaped plowshare 214 is secured to housing 202 and extends downwardly and forwardly, terminating in a squared chisel cutting edge 216. The plowshare 214 is provided with a rearwardly extending stiffening plate 218 having a lower rearward edge 220 in shape of a skid for a purpose that will be hereinafter set forth.

An elongated hydraulic linear actuator 222 is secured between the stiffening plate 218 of the plowshare and the structural cross member 154. The linear actuator extends from a pillow block 224 which is secured to the cross member 154 downwardly and forwardly to a pivot pin 226 attached to the rear edge of the stiffening plate 214 so that the alignment of the linear actuator is below the plowshare pivot pin 204. The depth of plowing is then accomplished by remote control of the linear actuator 222 to vary the depth of the plow as shown in FIG. 7 and indicated by the dashed lines at reference character 228. It is noted that when the plow is in a retracted position as shown by the dashed lines at 228, the lower skid shape 220 would permit the plow to pass over existing cross pipelines or other obstacles on the ocean floor.

The plow further comprises a pair of outwardly and rearwardly extending diverter blades 229 and 230, the outer rear ends of which are connected to the frame 140 by structural members 232 and 234, respectively. The forward ends of the diverter blades 229 and 230 form a rectangular space for movement of the chisel plowshare 214 therethrough.

The diverter blade 229 is provided with an outwardly extending turning blade 236 along the upper edge thereof. Likewise, a turning blade 238 is secured along the top edge of the diverter blade 230 to prevent soil being carried thereby from moving over the top of the blade.

Figure 10:
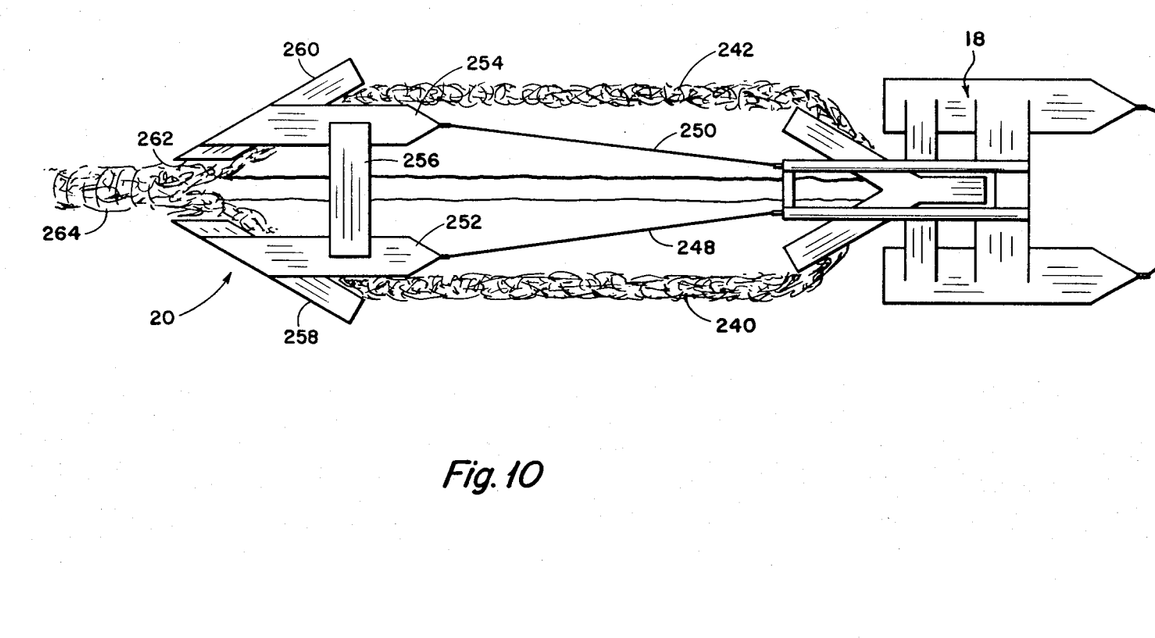
FIG. 10 is a top plan view of the plow and backfilling apparatus of FIG. 1.

In operation, the soil is removed by the chisel plowshare 214 upwardly to form a trench. When the soil reaches the divider blade 208 it is moved outwardly by diverter plates 210 and 212. At this point the soil from the trench is picked up by the diverter blades 229 and 230 and moved outwardly away from the trench into a pair of parallel rows 240 and 242 as shown in FIG. 10.

The plow 18 further comprises a pair of outwardly extending cable reels 244 and 246 secured to the rear end of the frame member 140 for adjustably towing the backfilling sled 20 by means of cables 248 and 250.

The backfilling sled 20 comprises a pair of spaced parallel runners 252 and 254 which are held in spaced relationship by a cross frame 256 connected therebetween. A forwardly and outwardly facing diverter blade 258 is secured to the runner 252 and extends outwardly a sufficient distance to pick up the row of soil 240 for directing the soil back into the trench in order to bury the pipe 36.

Likewise, an outwardly forwardly extending diverter blade 260 is secured to the runner 256 and extends outwardly a sufficient distance to pick up the row of deposited soil 242. The rear ends of the diverter blades 258 and 260 are provided with an opening 262 therebetween in order to allow the soil that has been moved back over the trench to form a single mound 264 thereover.

In operation, the pipe 36 will typically be joined and constructed at a land base facility or possibly even aboard another barge and reeled onto the reel mechanism 12 in multiple layers utilizing the level wind mechanism 88 to insure smooth winding on the reel.

At the point of constructing the pipeline, a barge or vessel 14 will be placed into position above and forward of the intended pipeline and the trenching plow 18 will be connected to the vessel by means of the winch 30 and towing cable 32. The pipe 36 will be paid off the reel 12 through the straightening roll mechanism 58 pivotally attached thereto.

The normal catenary curve that the pipe 36 will assume as it is being moved into the trench provided by the plow, will be calculated and based on the calculations thereof, the length of the towing cables 248 and 250 for the sled member 20 will be adjusted to insure that the pipe 36 is on the bottom of the trench before backfilling occurs. The depth of the chisel plowshare 214 may be set aboard the vehicle by means of a control mechanism 266 depicted in the schematic of FIG. 11.

Suitable tension in the pipe 36 will be provided by the motivating power for the vessel and the braking mechanism carried by the reel drive unit 50. As the plowing and unreeling operation occurs, the pressure on the load sensor 184 or the roller 182 will be monitored to insure that the plow guide rollers are intersecting the pipe 36 at the proper position on the catenary curve.

Further, the sensing roller 186 may be monitored to determine the position of the pipe if it leaves the instrumented roller 182 as shown by the dashed lines 268 in FIG. 7. For example, if the instrumented roller 182 indicates that the load applied by the pipe 36 is too heavy at that point, this is an indication that the plow is too far back with respect to the catenary curve and the winch 130 may be utilized to move the plow forward with respect to the catenary curve to properly position the plow.

On the other hand, if the load on the sensor 182 is too light or if the pipe has moved off of the instrumented roller 182, the winch 130 is utilized to increase the length of the tow line 132 in order to move the plow position backward to properly intersect the catenary curve of the pipe 36.

Typically, the cross pipelines and cables are accurately mapped and when one is reached, the plowshare 214 may be retracted as shown in FIG. 7 in order to move the plow over the existing pipeline and begin the trench on the other side thereof. When this occurs the trenching at or around the existing pipeline or cable is dug out by hand utilizing divers and other equipment apart from the present invention. This handwork for cross pipelines is performed before the backfilling apparatus 20 reaches the cross structure.

From the foregoing it is apparent that the present invention provides an efficient system for continuously laying marine pipeline by means of a variable departure angle reel, an adjustable trenching plow and cooperating backfilling apparatus.

Whereas the present invention has been described in particular relation to the drawings attached hereto, other and further modifications apart from those shown or suggested herein may be made within the spirit and scope of the invention.

What is claimed is:

1. A marine pipe laying reel comprising a rotatable drum member adaptable for carrying multiple windings and multiple layers of pipe thereon, said drum being rotatably adapted to be carried by a marine vessel, a pipe straightener means pivotally carried by the rotational axis of the reel for straightening the pipe as it is paid off the reel, and wherein the pipe straightener means comprises an elongated frame pivotally carried by the rotational axis of the reel, the frame comprising at least two straightening rollers, one said roller being movable with respect to the other roller and including means for adjusting the relative position of said straightening rollers for varying the bending moment applied to the pipe.

2. A marine pipe laying reel comprising a rotatable drum member adaptable for carrying multiple windings and multiple layers of pipe thereon, said drum being rotatably adapted to be carried by a marine vessel, a pipe straightener means pivotally carried by the rotational axis of the reel for straightening the pipe as it is paid off the reel and including level winding means carried by the pipe straightener means and being laterally movable thereon, said level winding means comprising a pair of spaced rollers for laterally adjusting the position of the pipe with respect thereto, and including means carried by the level winding means for moving said guide rollers out of contact with the pipe.

3. A reel as set forth in claims 1 or 2 and including braking means carried by the reel for controlling pipe tension.

4. A reel as set forth in claims 1 or 2 and including means for adjusting the angular position of the straightener means about the rotational axis of the reel.

5. A reel as set forth in claim 1 wherein the straightening rollers have a length of at least the width of the reel.

6. A reel as set forth in claims 1 or 2 and including a third roller carried by the elongated frame and disposed adjacent the reel, said roller being engagable with the pipe as it exits the reel.

* * * * *